US011570114B2

(12) United States Patent
Chow et al.

(10) Patent No.: US 11,570,114 B2
(45) Date of Patent: Jan. 31, 2023

(54) SYSTEM AND METHOD OF ADAPTIVE RATE CONTROL AND TRAFFIC MANAGEMENT

(71) Applicant: MOBOPHILES, INC., Los Altos, CA (US)

(72) Inventors: William Weiyeh Chow, Los Angeles, CA (US); Brian Alex Truong, Cerritos, CA (US)

(73) Assignee: MOBOPHILES, INC., Los Altos, CA (US)

( * ) Notice: Subject to any disclaimer, the term of this patent is extended or adjusted under 35 U.S.C. 154(b) by 484 days.

(21) Appl. No.: 14/848,302

(22) Filed: Sep. 8, 2015

(65) Prior Publication Data

US 2016/0072716 A1 Mar. 10, 2016

Related U.S. Application Data

(60) Provisional application No. 62/046,874, filed on Sep. 5, 2014.

(51) Int. Cl.
| | | |
|---|---|---|
| G06F 15/16 | (2006.01) | |
| H04L 47/2475 | (2022.01) | |
| H04L 67/02 | (2022.01) | |
| H04L 47/20 | (2022.01) | |
| H04L 47/25 | (2022.01) | |
| H04L 67/10 | (2022.01) | |
| H04L 67/04 | (2022.01) | |

(Continued)

(52) U.S. Cl.
CPC .......... *H04L 47/2475* (2013.01); *H04L 47/20* (2013.01); *H04L 47/25* (2013.01);
(Continued)

(58) Field of Classification Search
CPC ..... H04L 65/4084; H04L 65/80; H04L 67/02; H04L 63/0272; H04L 65/602;
(Continued)

(56) References Cited

U.S. PATENT DOCUMENTS 6,532,593 B1 * 3/2003 Moroney ........... H04N 21/4147
725/142
7,286,471 B2 10/2007 Kloth et al.
(Continued)

FOREIGN PATENT DOCUMENTS

| WO | WO 2013/017165 A1 | 2/2013 |
| WO | WO 2014/060927 A2 | 4/2014 |
| WO | WO 2014/126784 A1 | 8/2014 |

OTHER PUBLICATIONS

International Search Report and Written Opinion for corresponding PCT Application No. PCT/US2015/048721, dated Dec. 8, 2015 (8 pages).

(Continued)

*Primary Examiner* — Padma Mundur
(74) *Attorney, Agent, or Firm* — Lewis Roca Rothgerber Christie LLP

(57) ABSTRACT

A system and method of communication traffic management on a portable communication device having a computer processor and a network connection to a computer server for transmitting or receiving data with the processor over a network is provided. The method includes: identifying, by a traffic manager application running on the processor, a first application running on the processor and delivering first data to or from the server over the network; intercepting, by the traffic manager application, electronic traffic of the first data to or from the first application or to or from the server; and controlling, by the traffic manager application, a rate of delivery of the first data to or from the first application. The system includes the portable communication device and a (Continued)

nonvolatile storage device coupled to the processor and storing instructions that, when executed by the processor, cause the processor to execute the steps of the method.

28 Claims, 9 Drawing Sheets

(51) Int. Cl.
*H04L 65/61* (2022.01)
*H04L 67/01* (2022.01)
*H04L 67/563* (2022.01)
*H04L 67/564* (2022.01)
*H04L 67/5681* (2022.01)

(52) U.S. Cl.
CPC .............. *H04L 65/61* (2022.05); *H04L 67/01* (2022.05); *H04L 67/02* (2013.01); *H04L 67/04* (2013.01); *H04L 67/10* (2013.01); *H04L 67/563* (2022.05); *H04L 67/564* (2022.05); *H04L 67/5681* (2022.05)

(58) Field of Classification Search
CPC . H04L 67/06; H04L 67/2828; H04L 67/2842; H04L 67/306; H04L 43/50; H04L 47/2475; H04L 61/00; H04L 61/1511; H04L 63/0236; H04L 63/102; H04L 65/105; H04L 65/4076; H04L 65/4092; H04L 65/605; H04L 67/1085; H04L 67/1095; H04L 67/2833; H04L 67/2847; H04L 67/289; H04L 67/32; H04L 67/322; H04L 69/164; H04L 69/24
See application file for complete search history.

(56) References Cited

U.S. PATENT DOCUMENTS

| | | | |
|---|---|---|---|
| 8,526,815 | B2 | 9/2013 | Adler et al. |
| 8,897,292 | B2 | 11/2014 | Yip et al. |
| 2010/0309786 | A1* | 12/2010 | Moisand ............. H04L 67/2804 370/235 |
| 2011/0082924 | A1* | 4/2011 | Gopalakrishnan ...... H04L 65/80 709/223 |
| 2012/0023190 | A1* | 1/2012 | Backholm ......... H04M 3/42178 709/217 |
| 2012/0265897 | A1* | 10/2012 | Das ......................... H04L 67/22 709/232 |
| 2013/0007831 | A1* | 1/2013 | Wu .................... H04N 21/2385 725/116 |
| 2013/0114408 | A1 | 5/2013 | Sastry et al. |
| 2013/0159150 | A1 | 6/2013 | Hao et al. |
| 2013/0298201 | A1* | 11/2013 | Aravindakshan ... H04L 63/0272 726/4 |
| 2013/0328845 | A1* | 12/2013 | Pylappan .................. G06F 3/14 345/211 |
| 2014/0310386 | A1* | 10/2014 | Srinivasan .......... H04L 67/1085 709/219 |

OTHER PUBLICATIONS

European Extended Search Report for corresponding EP Application No. 15837806.7, dated Mar. 14, 2018 (8 pages).
Japanese Office Action for Japanese Application No. 2017-512981, dated May 28, 2019 (3 pages) and English translation (3 pages).
Office action for Chinese Application No. 201580060453.6, dated Nov. 5, 2019 (9 pages), and English translation (10 pages).
European Search Report for Application No. EP 19 19 3880.2, dated Jan. 7, 2020 (7 pages).

* cited by examiner

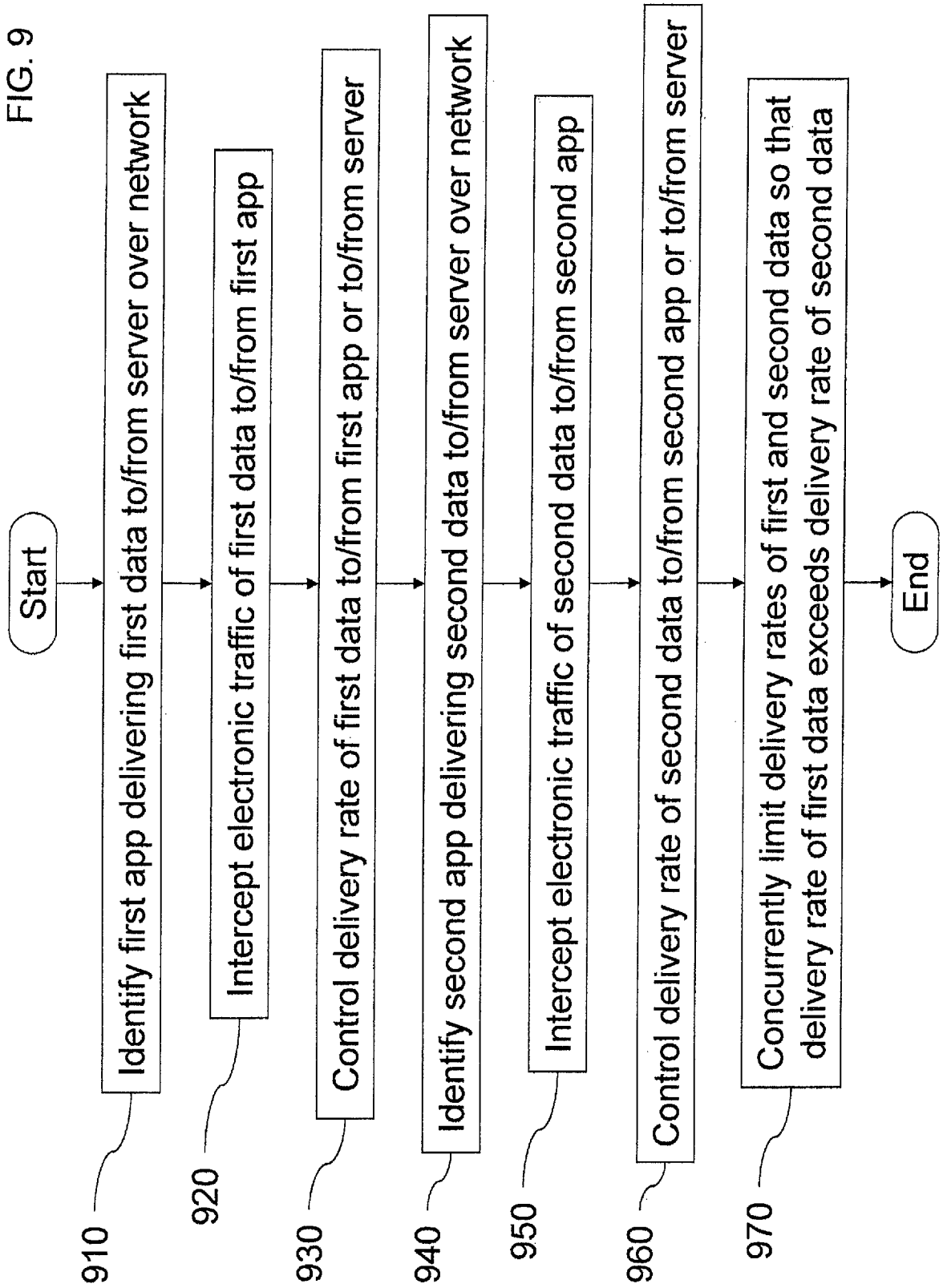

SYSTEM AND METHOD OF ADAPTIVE RATE CONTROL AND TRAFFIC MANAGEMENT

CROSS-REFERENCE TO RELATED APPLICATIONS

This application claims priority to and the benefit of PCT Application PCT/US2015/048721, filed on Sep. 4, 2015 in the U.S. Receiving Office, and U.S. Provisional Application No. 62/046,874, filed on Sep. 5, 2014, which is related to U.S. Provisional Application No. 61/947,982, filed on Mar. 4, 2014, the entire contents of all of which are herein incorporated by reference.

BACKGROUND

1. Field

Aspects of embodiments of the present invention relate to a system and method of adaptive rate control and traffic management.

2. Description of Related Art

The increasing use of high-bandwidth applications, such as streaming video, for electronic devices (including portable electronic devices such as smartphones or tablets), has placed significant demands on wireless data networks, such as cellular data networks. Presently, there are numerous portable devices and applications ("apps") running on these devices trying to make use of the same limited network bandwidth. While caching server content on the device helps with repeat requests for the same data, this is often or usually not the case with many of these high-bandwidth applications, such as when watching video content or listening to audio content in real time on a portable device.

Current mobile communications systems, such as cellular networks, suffer from problems caused by limited capacity being outpaced by accelerating demand. Capacity is limited by finite wireless spectrum of each mobile network operator, technology reaching physical limits in spectral capacity of existing spectrum and long regulatory lead times for access to new spectrum. At the same time, demand from more users becoming mobile and mobile devices becoming faster/smarter is outpacing the available capacity. The result of insufficient capacity is network congestion, poor user experience, and missed revenue opportunities for mobile services.

There are many causes for the mismatch between user demand and network mobile network capacity, such as faster devices, increasingly data-hungry or "noisy" apps, and growth of mobile video. Mobile video consumption is a particular problem, since it is increasing data consumption faster than any other mobile activity, largely due to the inherent behavior of adaptive video streaming to automatically use up to all of the available network capacity. While adaptive video streaming was designed to allow the device to automatically adapt the video quality downward for slower networks, it also enables the opposite behavior of automatically adapting the video quality upward for faster networks that may result in an unexpectedly high data usage for the user.

Unfortunately, the user or mobile network operator does not have sufficient insight or control to manage their data usage so this demand/capacity mismatch generally results in poor user experience and/or high end user costs. Mobile operators have little or no visibility from the network to see the specific apps that may be overly chatty or use excess data, and thus lack the precision to adjust/limit their impact on the mobile network. While mobile operators may deploy some tools in the network, such as intelligent switches and proxy servers, to monitor and/or control the data consumption from particular users, these tools lack sufficient granularity because they cannot reliably identify the specific app for specific traffic. For the end users, they have little or no controls to manage their data consumption, such as preventing a high bandwidth video stream from exhausting their data plan or allowing/blocking specific apps from using data when roaming. This prevents the end user from being able to manage their data consumption, costs, and user experience.

SUMMARY

Aspects of embodiments of the present invention are directed toward monitoring and controlling traffic on a portable device, such as a smartphone. Further aspects are directed toward a system and method of adaptive rate control and traffic management.

Aspects of embodiments of the present invention address these and other concerns by providing detection and control of application-level data usage from within the mobile device. In further detail, aspects of the present invention provide for significant reduction in data consumption by limiting the data rate provided to a mobile app, such as with adaptive video streams. Further aspects provide for reduction in radio signaling and cellular congestion by receiving data to the app/device in bursts to reduce the total amount of time a device needs to be connected to the cell tower to receive the data. Still further aspects provide for fine-grain tracking and control of the network capacity that is allowed/restricted for a mobile app.

Accordingly, embodiments of the present invention provide for the ability to process the mobile traffic performed by the apps on the mobile device. The ability to process this traffic "in band" enables a wide variety of monitoring and control capabilities to be applied to the mobile app traffic. The ability to process this traffic within the device enables these capabilities across any network accessed by the device. Embodiments of the present invention provide for multiple ways in which in-band monitoring and control may be achieved on a mobile device, such as using a proxy configuration, a VPN tunnel device, or request interception within the mobile app.

Embodiments of the present invention are directed to improving or optimizing bandwidth of data streaming applications (such as video or audio). Embodiments of the present invention are directed to storing some content temporarily (such as pre-fetching the next few video chunks), including streaming files that are amenable to video or audio streaming technology, such as ABR (adaptive bitrate) that adjusts the quality of the multimedia stream to match that of the available bandwidth with which to transmit the stream.

Embodiments of the present invention are directed to adaptive bitrate (ABR) control (such as optimizing the app to request data in such a manner as to minimize bandwidth usage with existing protocols) and to connection control (such as minimizing connection time to the network to that needed to get data as efficiently as possible).

Embodiments of the present invention are directed to bitrate control of data speed, pre-fetching stream chunks (in advance of the app requesting it, to avoid opening a connection later), policy-based rules to determine the desired bitrate control speed for the bitrate control of the data speed and the amount of pre-fetch when pre-fetching the stream chunks (such as video stream chunks), as well as for allowing and disallowing certain requests (for example, to control or limit an app's use of the network).

The bitrate control of data speed may be used, for example, to reduce bandwidth use, and may be combined with pre-fetching the stream chunks in some cases to reduce connection time, such as for streaming content (e.g., video). Another term for the policy-based rules to control these is "endpoint traffic management," which may be used to limit the type and frequency of requests that apps can perform.

It should be noted that the above-described techniques have not been enabled previously on an endpoint device, such as a smartphone or tablet.

In an embodiment of the present invention, an adaptive bitrate determines how the data is being delivered and optimizes requests from the client to take advantage of that (buffering excess content until the user really wants it). In other embodiments, the bitrate control determines how quickly data is being delivered to the app requesting it. For example, this may apply to "adaptive bit rate streams," where the app has a choice of multiple sizes of an item to request (e.g., the same video at multiple resolutions) and slowing down the pace will cause the app to choose the smaller sized version (thus using less bandwidth).

In an embodiment of the present invention, connection control tries to make the most use of a connection period, then disconnect to allow other applications/users access to the network until it needs access again.

In an embodiment of the present invention, traffic management adds numerous usability features (security, usage monitoring, etc.) not currently available to a system. In one or more embodiments, these features may be either usability (for an end user) or control/protection for the network operator (e.g., cellular provider). In some embodiments, they may rely on or have a traffic manager (such as a proxy) sitting in a central point of traffic flow on the endpoint device so that it may apply policies and make decisions.

In an embodiment of the present invention, a method of communication traffic management on a portable communication device having a computer processor and a network connection to a computer server for transmitting or receiving data with the processor over a network is provided. The method includes: identifying, by a traffic manager application running on the processor, a first application running on the processor and delivering first data to or from the server over the network; intercepting, by the traffic manager application, electronic traffic of the first data to or from the first application; and controlling, by the traffic manager application, a rate of delivery of the first data to or from the first application or to or from the server.

The controlling of the rate of delivery of the first data may include throttling a present speed of the network as perceived by the first application to a first data rate less than the present speed of the network.

The electronic traffic of the first data may include data being transmitted using a secure protocol for Hypertext Transfer Protocol (HTTPS).

The controlling of the rate of delivery of the first data may include throttling the rate of delivery of the first data to or from the server to a first data rate less than a present speed of the network.

The electronic traffic of the first data may include an adaptive bitrate stream.

The electronic traffic of the first data may include a progressive stream.

The first application may be capable of supporting a plurality of data rates having different corresponding resolutions as controlled by a manifest. The controlling of the rate of delivery of the first data may include editing the manifest to hide or remove those of the data rates that exceed a first data rate.

The first application may be capable of supporting a plurality of data rates having different corresponding resolutions. The controlling of the rate of delivery of the first data may include failing or blocking access to those of the data rates that exceed a first data rate.

The method may further include: identifying, by the traffic manager application, a second application running on the processor and delivering second data to or from the server over the network; intercepting, by the traffic manager application, electronic traffic of the second data to or from the second application; and controlling, by the traffic manager application, a rate of delivery of the second data to or from the second application or to or from the server.

The controlling of the rates of delivery of the first and second data may include concurrently limiting the rates of delivery of the first and second data so that the rate of delivery of the first data exceeds the rate of delivery of the second data.

The intercepting of the electronic traffic may include using an internal proxy running on the processor.

The intercepting of the electronic traffic may include using a virtual private network (VPN) interface on the processor.

The intercepting of the electronic traffic may include running a modified said first application on the processor, the modified first application being configured to request the intercepting of the electronic traffic.

In another embodiment of the present invention, a system for communication traffic management is provided. The system includes a portable communication device having a computer processor and a network connection to a computer server for transmitting or receiving data with the processor over a network, and a nonvolatile storage device coupled to the processor. The nonvolatile storage device stores instructions that, when executed by the processor, cause the processor to: identify a first application running on the processor and delivering first data to or from the server over the network; intercept electronic traffic of the first data to or from the first application; and control a rate of delivery of the first data to or from the first application or to or from the server.

The instructions, when executed by the processor, may further cause the processor to control the rate of delivery of the first data by throttling a present speed of the network as perceived by the first application to a first data rate less than the present speed of the network.

The electronic traffic of the first data may include data being transmitted using a secure protocol for Hypertext Transfer Protocol (HTTPS).

The instructions, when executed by the processor, may further cause the processor to control the rate of delivery of the first data by throttling the rate of delivery of the first data to or from the server to a first data rate less than a present speed of the network.

The electronic traffic of the first data may include an adaptive bitrate stream.

The electronic traffic of the first data may include a progressive stream.

The first application may be capable of supporting a plurality of data rates having different corresponding resolutions as controlled by a manifest. The instructions, when executed by the processor, may further cause the processor to control the rate of delivery of the first data by editing the manifest to hide or remove those of the data rates that exceed a first data rate.

The first application may be capable of supporting a plurality of data rates having different corresponding resolutions. The instructions, when executed by the processor, may further cause the processor to control the rate of delivery of the first data by failing or blocking access to those of the data rates that exceed a first data rate.

The instructions, when executed by the processor, may further cause the processor to: identify a second application running on the processor and delivering second data to or from the server over the network; intercept electronic traffic of the second data to or from the second application; and control a rate of delivery of the second data to or from the second application or to or from the server.

The instructions, when executed by the processor, may further cause the processor to control the rates of delivery of the first and second data by concurrently limiting the rates of delivery of the first and second data so that the rate of delivery of the first data exceeds the rate of delivery of the second data.

The instructions, when executed by the processor, may further cause the processor to intercept the electronic traffic by using an internal proxy running on the processor.

The instructions, when executed by the processor, may further cause the processor to intercept the electronic traffic by using a virtual private network (VPN) interface on the processor.

The instructions, when executed by the processor, may further cause the processor to intercept the electronic traffic by running a modified said first application on the processor, the modified first application being configured to request the intercepting of the electronic traffic.

BRIEF DESCRIPTION OF THE DRAWINGS

The accompanying drawings, together with the specification, illustrate example embodiments of the present invention. These drawings, together with the description, serve to better explain aspects and principles of the present invention.

FIG. 9 is a flow diagram illustrating an example method of adaptive rate control and traffic management according to an embodiment of the present invention.

DETAILED DESCRIPTION

Figure 1:
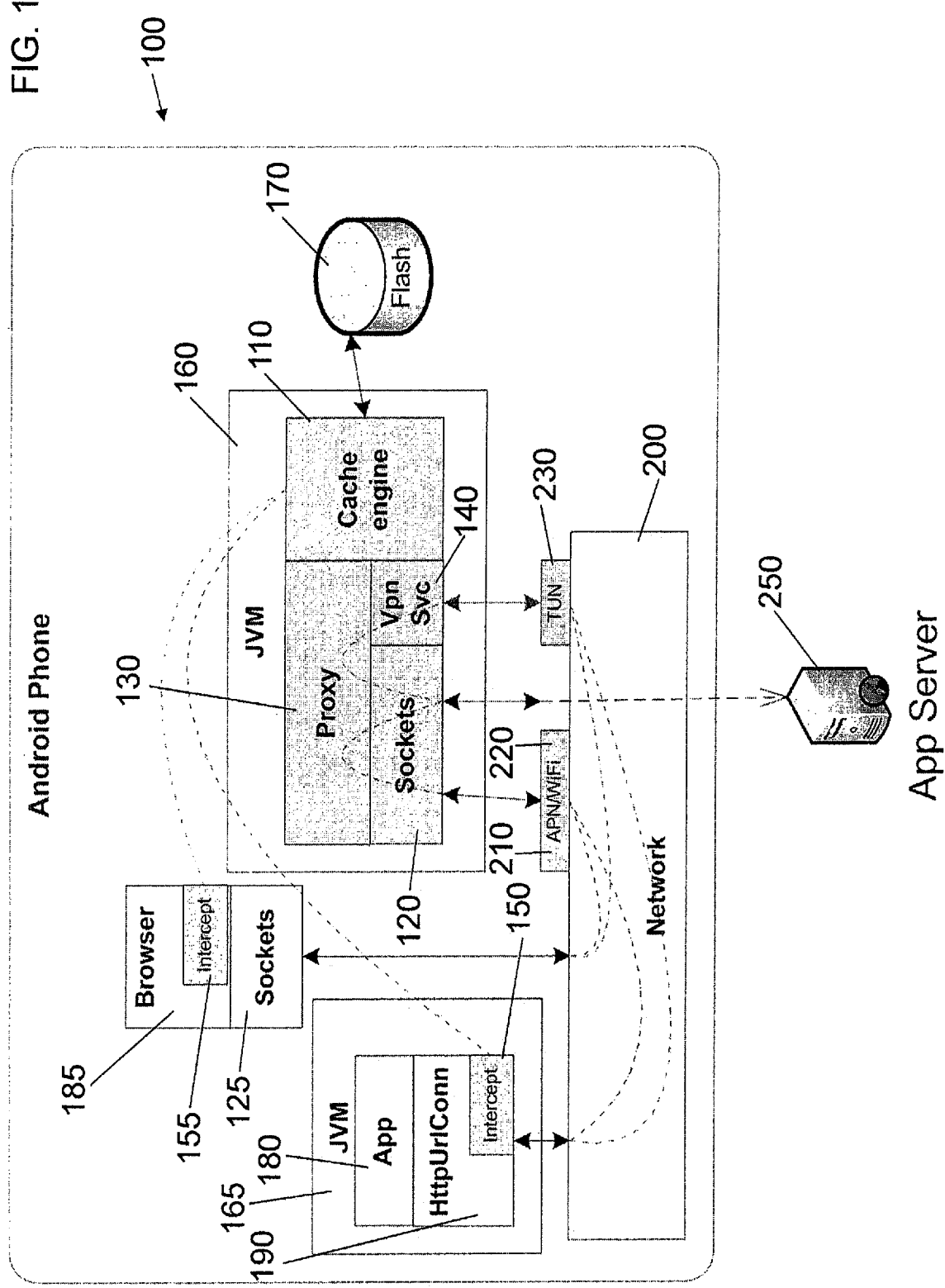
FIG. 1 is a schematic diagram of an example mobile device (such as a smartphone) architecture suitable for use with an on-device traffic management implementation according to an embodiment of the present invention.

Example embodiments of the present invention will now be described with reference to the accompanying drawings.

In the drawings, the same or similar reference numerals refer to the same or similar elements throughout. Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed.

In one or more embodiments, systems and methods for managing network traffic within a mobile device are provided. Example embodiments are described with reference to FIGS. 1-9.

FIG. 1 is a schematic diagram of an example mobile device (such as a smartphone) architecture 100 suitable for use with an on-device traffic management implementation according to an embodiment of the present invention. For instance, the mobile device may be an Android phone. For purposes of illustration, the mobile device will be assumed to be an Android smartphone. Further, while such mobile devices may be capable of supporting many users, for ease of description, it will be assumed that a mobile device is dedicated to a particular user, so the term "user" and "mobile device" (or any computing device used in a personal or portable manner) may be used synonymously throughout.

According to one or more embodiments of the present invention, the general architecture on mobile devices (such as architecture 100) provides for a centralized proxy 130 that may monitor or control the data traffic originating from applications (e.g., mobile apps, or just "apps") to, for example, an application server (or app server) 250 that the mobile device accesses, e.g., via a Wi-Fi or cellular network. This approach enables traffic management to be performed across multiple networks (e.g., WiFi and cellular) and across multiple apps, and allows the traffic management to be centrally managed, although the present invention is not limited thereto. In other embodiments, the traffic management may be performed in a distributed manner, such as with a proxy running within each app, where they are operating in a coordinated manner such that the overall device traffic is effectively centrally managed.

The apps and other programmable components of smartphone 100 may be implemented, for example, as sets of computer instructions stored on a non-transitory storage device of smartphone 100, and configured to be executed on one or more processors of the smartphone 100 or other portable electronic communication device. The proxy 130 may also manage traffic for particular web sites, such as from a web browser. Accordingly, for ease of description, terms such as "application," "app," "web site," or "site" may be used somewhat interchangeably throughout the present application when referring to categories of content being managed by the proxy 130.

The proxy 130 may be engaged from a number of different mechanisms, such as, for example, a proxy server (e.g., via operating system (OS) network settings) using sockets layer 120, a virtual private network (VPN) service (e.g., via OS network settings) using network tunnel (TUN) device 230, or embedded within an app using interception layer 150. The proxy 130 may be run on a Java virtual machine (JVM) 160. The proxy may, for instance, include a cache engine 110 for managing cached content on a physical storage device, such as flash memory 170 or other nonvolatile storage device. Without loss of generality, such a device may sometimes be referred to as a "disk," though it could be any type of non-transitory storage device, such as a solid-state drive. In addition, the cached or any other stored content may be stored, in whole or in part, on volatile storage, such as random access memory, and this volatile storage may be used in combination with nonvolatile storage, such as in a tiered manner where the most recently accessed content is stored in faster volatile storage before it is transitioned to slower nonvolatile storage.

The proxy 130 may run in a variety of form factors, such as an application, kernel driver, or within the OS on the mobile device, and be configured to receive network connections, for example, via OS network settings. In one or more embodiments, the proxy server may run in a JVM. The proxy 130 may act as an intermediary on behalf of client applications. For example, the proxy 130 may service the request of an app 180 running in another JVM 165.

The app 180 may want to access the Internet using, for example, an Android service such as HttpURLConnection 190. Here, HTTP stands for hypertext transfer protocol and URL stands for uniform resource locator (e.g., a web address). HttpURLConnection 190 may then invoke network services 200 to access the Internet. Network services 200 may access the Internet, for example, using access point name (APN) 210 (e.g., a mobile network such as 3G) or Wi-Fi connection 220. Network services 200 may be configured to route requests from app 180 to proxy server 130 using a proxy configuration applied globally to the system, or to the APN or WiFi connection. Network services 200 may also route requests from app 180 to proxy 130 using a variety of other ways, for example, via network tunnel (TUN) device 230 or IP routing tables (also known as "iptables").

Network services 200 may be configured to specify a proxy directly or indirectly (e.g., as a global system proxy directly detected and used by apps running on the device, or indirectly through a setting on the APN 210 or Wi-Fi connection 220) to access the Internet, such that a request may be sent through a standard communications layer, such as sockets 120 (e.g., a network socket for connecting to the Internet), which is received by the proxy 130. The proxy 130, in turn, may make a request to the app server 250 through network services 200 (while bypassing the APN or Wi-Fi proxy configuration to avoid looping back to itself), which services the request and returns any responding communications to the proxy 130. The proxy may then monitor or control the communications between apps and servers. The proxy 130 may also cache some, none, or all of the response via the caching engine 110 before returning the response through the network socket 120 to the app 180 through the same described stages in reverse.

Instead of using a proxy configuration on the APN or Wi-Fi connection, the network services 200 may also be configured to route requests to proxy server 130 through a variety of other means. For example, another approach is using a network tunnel (TUN) 230 to establish a VPN connection, which may route network activity to VPN service 140 to handle the network transmission. The VPN service 140 may then route the request to the proxy 130 to manage the traffic between the app and app server 250 using the sockets 120 (as appropriate) to service the request and return the response via the network tunnel 230.

Another mechanism for engaging the proxy 130 is to use an interception layer (such as interception layers 150 and 155) within an app to redirect traffic to the proxy process. For example, in the above example, before or in place of having HttpURLConnection 190 invoke network services 200 to access the Internet, HttpURLConnection may have an interception layer 150 intercept the request from app 180 and directly forward its traffic to the proxy 130. Forwarding to the proxy 130 from intercept 150 may be performed through network services 200 or using standard inter-process communications mechanism as would be apparent to one of ordinary skill in the art, such as message queues, named pipes, or shared memory.

In addition to the proxy 130 operating in a separate process, such as within JVM 160, in other embodiments, the proxy 130 may be embedded within the requesting process, such as JVM 165 or Browser 185 (such as a web browser). The proxy 130 may then manage the app's network traffic without the need for any inter-process communications.

In another example, the web browser 185 seeks to access the. Internet. Similar to the app 180 above, the web browser 185 may take advantage of the proxy 130 by a number of different approaches. For example, the web browser 185 may be configured to access the Internet by using network sockets 125, which could then use network services 200 to access the app server 250 and/or the proxy 130 using, for example, sockets 120 or VPN service 140 as described above. In a similar fashion, interception layer 155 may be added to the web browser 185, which may then intercept the request from the web browser 185 and forward its traffic to the proxy 130.

In further detail, the above techniques may be integrated into existing interfaces, with possible differentiation between Secure Sockets Layer (SSL, e.g., encrypted) communications and non-SSL (e.g., unencrypted) communications. Integration with applications may be enabled for non-SSL communications, for instance, in a centralized location in the network stack. For example, proxy 130 may be configured as the proxy for all or a subset of network protocols, such as only for HTTP, HTTPS, or both. Similarly, proxy 130 may be configured as the proxy for all or a subset of network interfaces, such as for cellular, WiFi, or both. For example, for APN 210 access, the cellular access point may be set to the proxy 130. For iptables access, the corresponding Internet Protocol (IP) routing table entries may be set. For VPN service, the VPN client (such as VPN service 140) may route traffic to the proxy 130. For Wi-Fi, the proxy 130 may be set for each Wi-Fi access point (AP). For a global system proxy, the system may direct traffic for all application traffic to the proxy 130.

In addition, integration with applications that use encrypted communications, such as SSL or TLS, may require access to unencrypted network data. There are a number of approaches that may be used here. For a man-in-the-middle approach, access to encrypted data may be obtained by impersonating the server via a trusted certificate authority (CA). For a software development kit (SDK) approach (such as with the interception layer 155 in FIG. 1), build-time linking with hooks to the caching engine 110 may be used above the encryption layer. For a relink approach, existing apps may be decompiled and relinked to use custom replacement application programming interfaces (API's), such as with HttpURLConnection 190. For a substitute approach, such as with a browser like web browser 185, an alternative version of the app may be provided where the interception is already wired in. This may be particularly appropriate for widely used open source apps.

While FIG. 1 is directed mostly to the architecture 100 of a mobile device, on-device traffic management may also entail other components, such as software components configured to run on one or more processors of mobile device 100. FIGS. 2-5 are block diagrams of the software components within a proxy 130 to enable monitoring and control of network traffic between an app 310 and a server 250 according to embodiments of the present invention.

Figure 2:
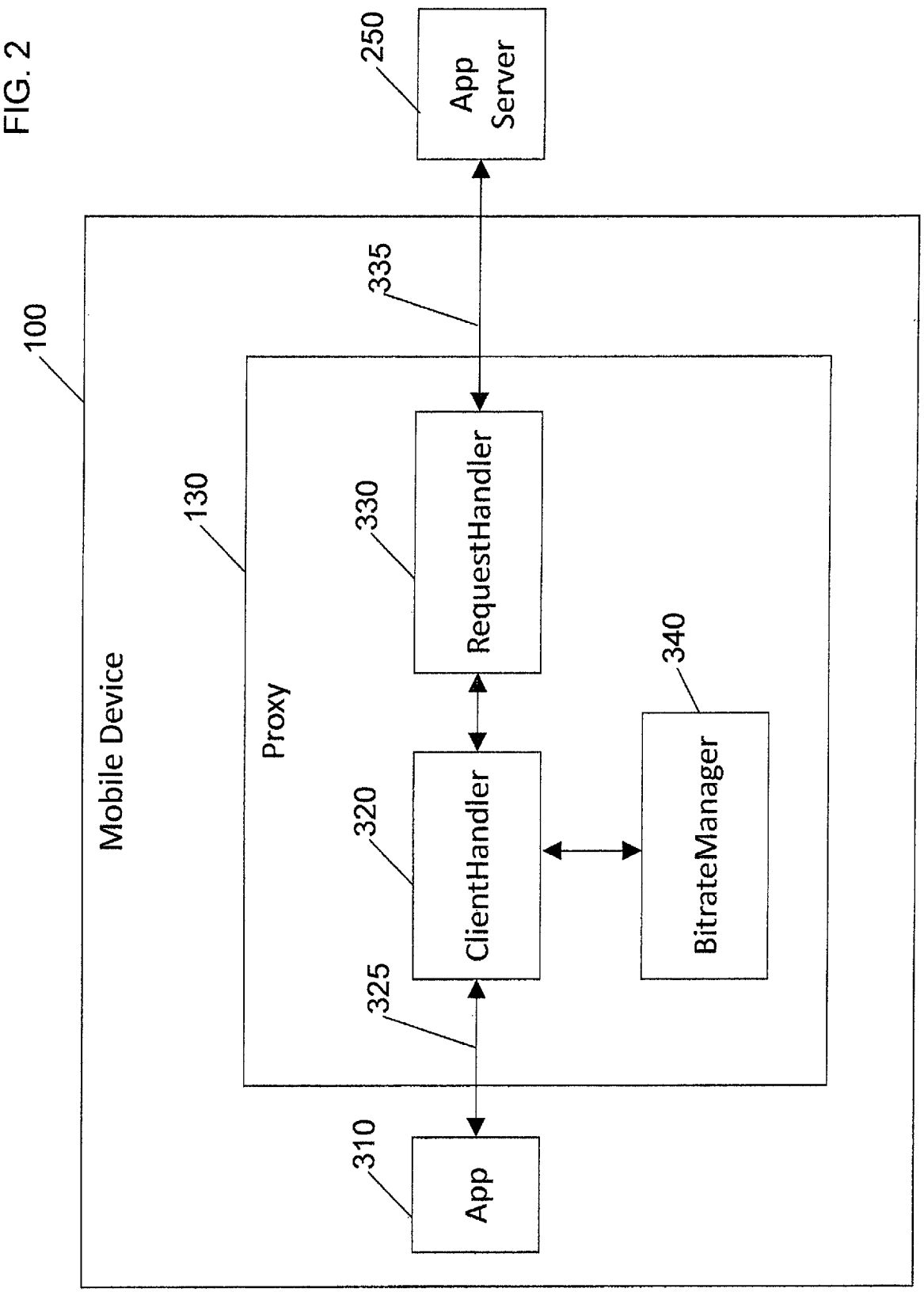
FIGS. 2-5 are block diagrams of the software components within a proxy to enable monitoring and control of network traffic between an app and a server according to embodiments of the present invention.
Figure 3:
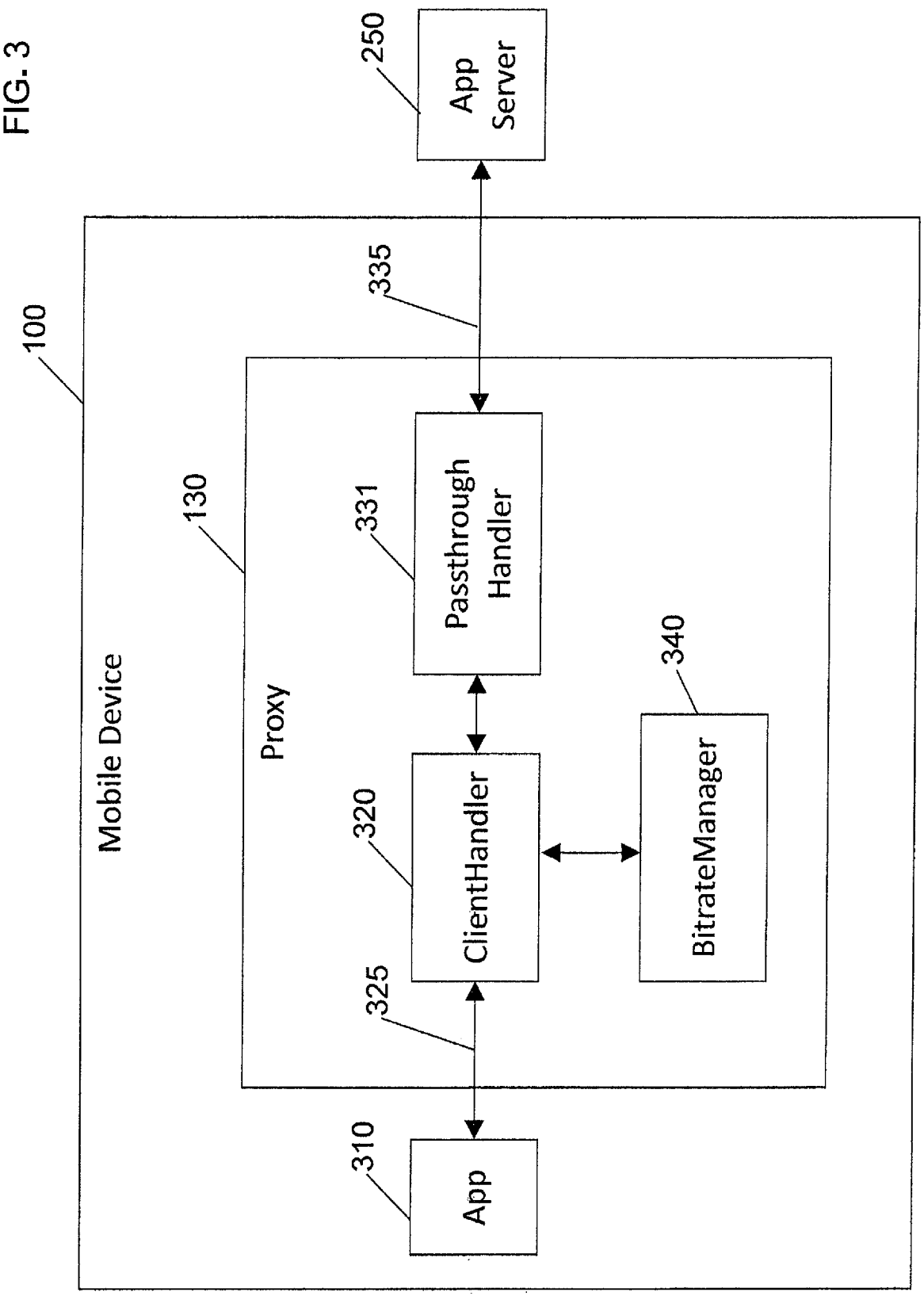
Figure 4:
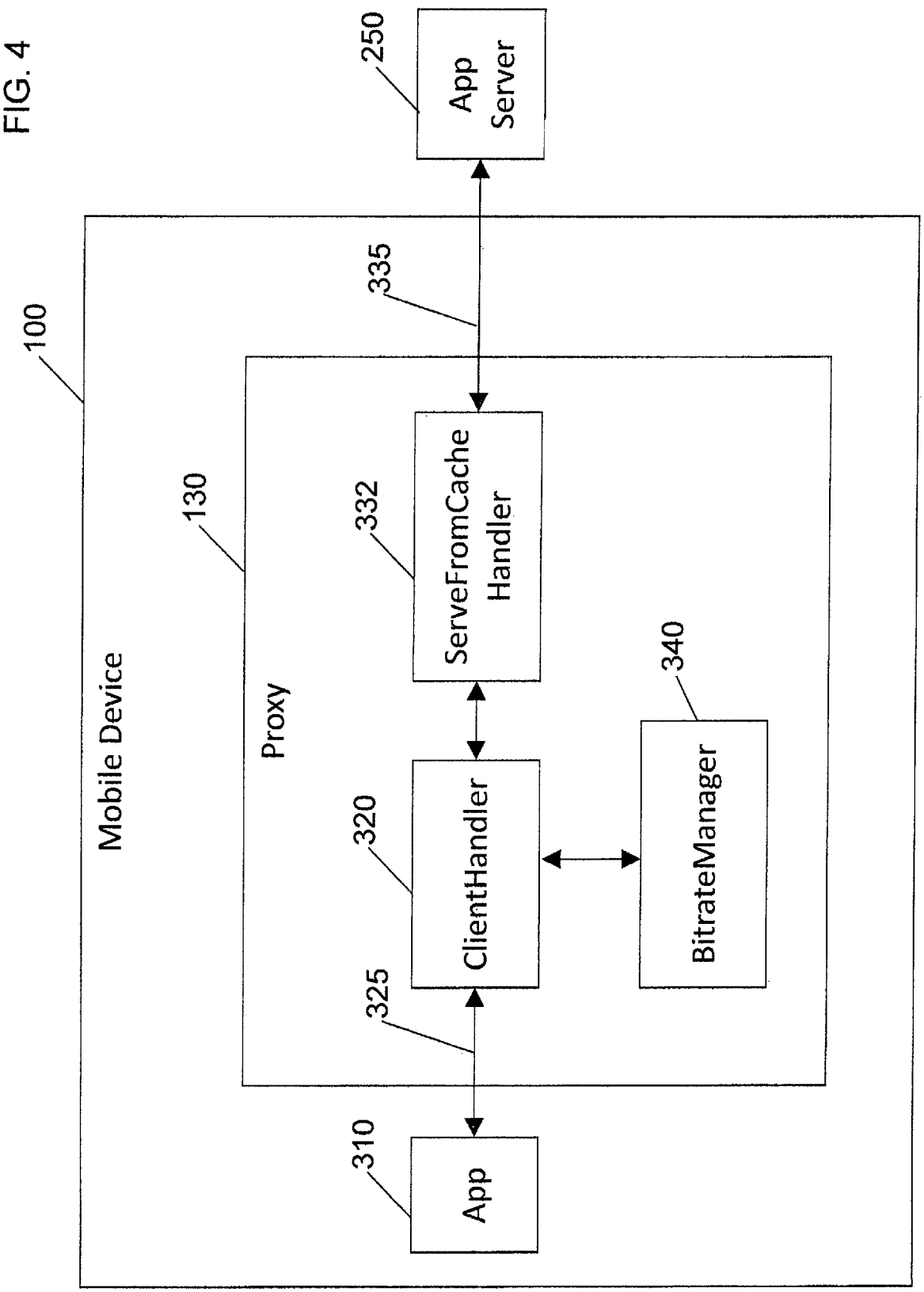
Figure 5:
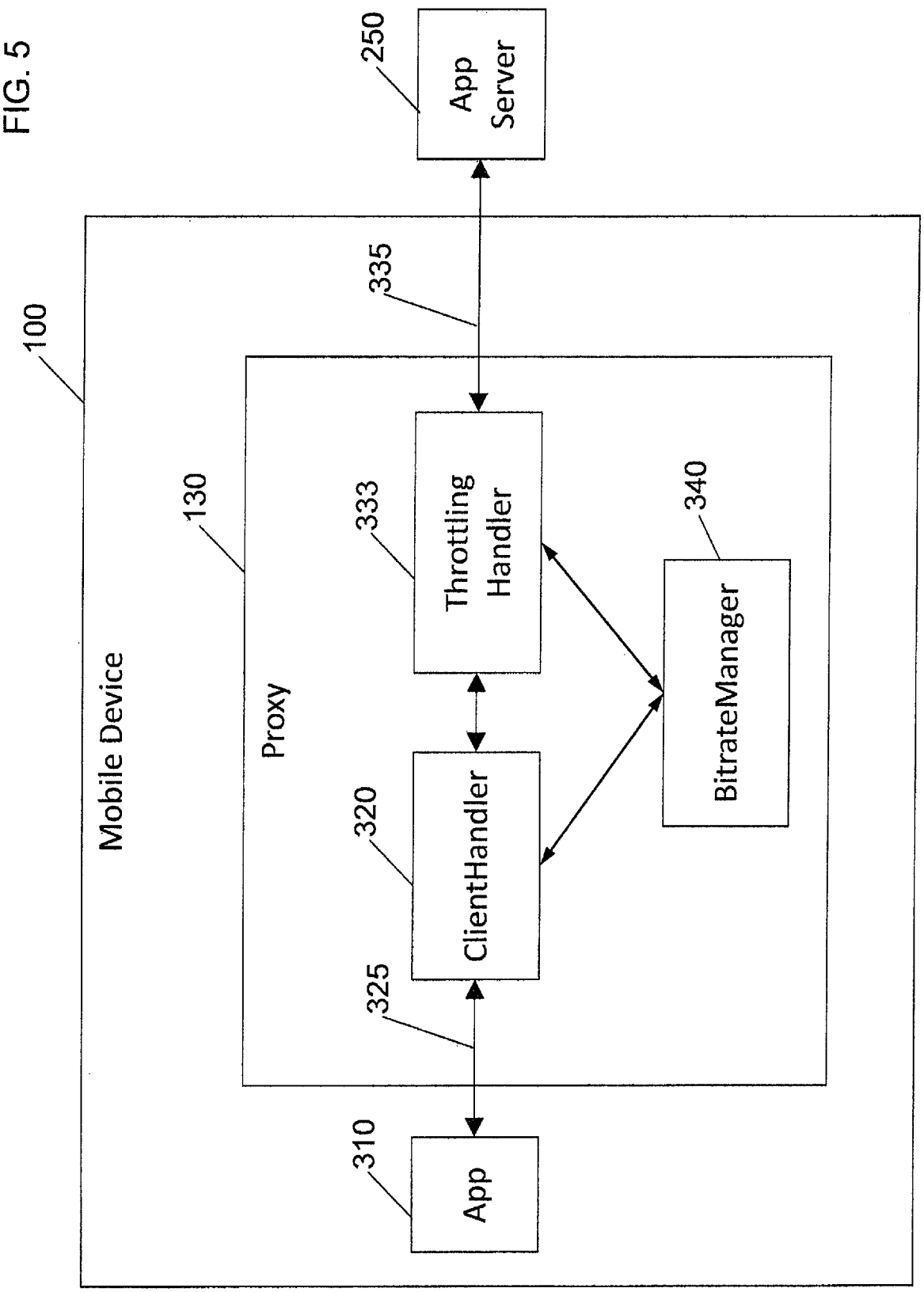

In FIG. 2, the app 310 running within the mobile device 100 communicates with app server 250, and proxy 130 would intercept the app's network traffic using any of the methods previously discussed, such as through a system proxy setting or VPN. Within proxy 130, in one or more embodiments of the present invention, there are logical software components that perform the network traffic monitoring and control, and these software components may include a ClientHandler 320 that may handle the data path 325 with app 310 and a RequestHandler 330 that may handle the data path 335 with app server 250.

The data path 325 between app 310 and ClientHandler 320 may take place over different mechanisms, depending on the method used to intercept the app's network traffic, such as a network socket or any other standard inter-process communications mechanism as would be apparent to one of ordinary skill. The data path 335 between RequestHandler 330 and app server 250 may also take place over different mechanisms, depending on how the app 310 would normally communicate with app server 250, such as with a network socket using TCP/IP. By decoupling the internal data path 325 with app 310 and the external data path 335 with app server 250, this allows proxy 130 to separately control the data rates between app 310 and app server 250, such as to deliver data to/from app 310 (over data path 325) at a slower rate than may actually be delivered to/from app server 250 (over data path 335).

According to another embodiment of the present invention, a BitrateManager 340 may be used to manage the appropriate bitrate (also known as data rate) to/from app 310 or to/from app server 250. This allows a separate software component to implement one or more policies for the bitrate, such as different bitrates for different users, different bitrates for different apps, different bitrates based on prior data consumption, different bitrates for different network types, and other variations as would be apparent to one of ordinary skill in the art. A policy to implement bitrates for different users may include a list of users or user categories, where a user category may be any group of users, such as by device type (e.g., smartphone vs tablet), device model, or data plan. A policy to implement different bitrates for different apps may include a list of bitrates per app or app categories, where an app category may be any grouping of apps, such as by functionality (e.g., video, social, email, gaming, navigation, etc.), by vendor or by some other category (e.g., work vs personal).

An app-based policy also may be based on how or when an app runs, such as allowing higher bitrates when the app is visible to the user (e.g., running in the foreground as opposed to the background), or enforcing lower bitrates for low priority apps when a higher priority app is running. A policy to implement different bitrates for different network types may include a list of bitrates per network type (e.g., WiFi, LTE, HSPA, CDMA, etc.) or a list of specific networks, such as specific cell towers or WiFi hotspots. A network-based policy may also be based on ownership or costs associated with the network, such as higher bitrates when accessing home network owned by the operator of the user's data plan but lower bitrates when the user is roaming on the network owned by another operator.

The rate limits being managed by BitrateManager is not limited to being just at the bit level and may also include limits on the rate of traffic in other increments or units, such as by requests, packets (e.g. TCP segments or IP packets), network connections, or other granularities apparent to anyone of ordinary skill in the art. For example, it may be desirable to limit the frequency of requests by "chatty" apps on certain network types to control/minimize the congestion they can cause since some types of networks (e.g., 2G and 3G cellular networks) may have a limited number of connections that can concurrently support.

Any of the aforementioned policies may be, for example, provided by the user, pre-configured by the app, or received from an external system, such as a management server. Any of the aforementioned policies may also be extended to have multiple or variable rate limits, such as rate limits that vary based on earlier data usage or traffic activity. For example, an app-based policy may allow multiple bitrate levels that decrease as an app's data consumption increases, such as to allow apps with lower data consumption to operate at a higher (or even unbounded) bitrate while limiting higher bandwidth apps as they exceed one or more thresholds.

For example, when app 310 performs a request to receive data from app server 250, the request would be initially received by ClientHandler 320, which then passes it to the appropriate type of RequestHandler 330 needed to process the request. Proxy 130 may support one or more types of RequestHandlers, such as a PassthroughHandler 331 in FIG. 3 that may pass the request through to app server 250. Another type of RequestHandler may be a ServeFromCacheHandler 332 in FIG. 4 that may respond to the request with contents from cache, by interacting with Cache Engine 110 and with app server 250 as needed to validate the freshness of the cached data. A further type of RequestHandler may be a ThrottlingHandler 333 in FIG. 5 that may control the rate of data path with app server 250, such as by sending request data or receiving response data at a lower rate than may otherwise be used or supported by the external network or server. In an embodiment of the present invention, each type RequestHandler may be implemented as a subclass of the RequestHandler superclass. The RequestHandler 330 is responsible for responding to the request and providing the response to ClientHandler 320, which then transmits the response to app 310.

When ClientHandler 320 receives response data from a RequestHandler 330, it may send the response data to app 310 and it may control how quickly that data is sent based on a rate limit provided to it by BitrateManager 340. ClientHandler 320 may implement the rate limit in a variety of methods apparent to one of ordinary skill, such as by sending a specific amount per time interval until the entire response is transmitted. In one embodiment of the present invention, ClientHandler 320 may be configured to transmit data to app 310 every second, so as data is received from app server 250, ClientHandler 320 will transmit data every second in an amount no higher than the per-second rate limit specified by BitrateManager 340. For example, if BitrateManager 340 indicates to ClientHandler 320 that it should limit the data rate for app 310 to 1000 kilobits per second, then ClientHandler 320 will transmit up to 1000 kilobits to app 310 every second until the entire response is transmitted. This allows RequestHandler 330 to receive data from app server 250 at a different (e.g., higher) rate than the rate that ClientHandler 320 is transmitting that data to app 310.

RequestHandler 330 may receive data from app server 250 at a higher rate than ClientHandler 320 is sending that data to app 310 by storing the data in device memory, which may be volatile or non-volatile. Non-volatile memory may be more plentiful so it may be used if a large amount of data needs to be buffered, such as when the data is being received from app server 250 at a significantly higher rate than the rate ClientHandler 320 is transmitting to app 310. According to an embodiment of the present invention, ThrottlingHandler 333 may manage the buffering, such as to store a portion of the data received from app server 250 to non-volatile memory when ClientHandler 320 is not yet ready to transmit it to app 310. ThrottlingHandler 333 may also limit how much or how quickly it receives data from app server 250, such as to avoid exceeding the memory or storage available on the device.

For example, data path 335 may be a TCP-based network socket and ThrottlingHandler 333 may stop receiving data from the network socket, which would cause app server 250 to stop sending data when the TCP receive window on that network socket is full. A RequestHandler, such as ThrottlingHandler 333, may analyze the data received from app server 250 to determine the rate at which it receives data from app server 250.

In some cases, it may be desirable to receive video data at (or about) the rate at which the data is actually consumed by a video app, such as to avoid, lessen, or minimize receiving video data that would not be consumed if the user stops watching (but continues receiving) the video. This approach may be applied to different types of apps, since there generally is little or no relationship between how quickly an app consumes data and how quickly the network/server is capable of delivering that data. Excess data sent from the server to the device can eat into the user's data plan as well as consume storage resources on the user's device.

For example, an MPEG-4 video may be encoded at a bitrate (e.g., quality or resolution) that is lower than the rate that a mobile device may currently receive that video data from the network/server, such as when the device has a good cellular signal on an uncongested cell site. However, the user may not be interested in viewing the entire video stream. Therefore, if, for example, the MPEG-4 video is encoded at a bitrate of 2 mbps and the device is receiving that data at 4 mbps, then there is a potential for a significant amount, such as 50%, of the received video data to be wasted (e.g., received and buffered) if the user does not watch the entire video. This waste may also count against the user's data plan (such as monthly allocation of network data). One or more embodiments of the present invention may address this by aligning the video encoding bitrate and the network delivery bitrate to avoid, lessen, or minimize wasted data received over the network but never used by the user.

According to an embodiment of the present invention, Proxy 130 may coordinate the video and network bitrates by parsing the data received from app server 250. When app 310 requests a video from app server 250, ThrottlingHandler 333 may parse the received data to determine the video encoding bitrate, which it may use to determine the rate at which it will receive data from app server 250. For example, using the prior example, when ThrottlingHandler 333 detects a video encoded at 2 mbps, it may ensure that it receives data from app server 250 at an equivalent rate, perhaps adjusted slightly higher to accommodate any known/detected variations in the network delivery rate.

By limiting the rate of data delivery to app 310, embodiments of the present invention may reduce the data consumption of content that adapts its data size based on the rate, such as adaptive bitrate (ABR) video streams. Examples of ABR streaming technologies include Dynamic Adaptive Streaming over HTTP (DASH), Adobe Adaptive Streaming for Flash, HTTP Live Streaming (HLS), and Microsoft Smooth Streaming. For example, YouTube videos are encoded for a wide variety of video resolutions, each of which corresponds to a particular data delivery rate, such that the YouTube app requests the highest video resolution that may be supported by its perceived rate of data delivery. The table below shows the estimated data usage rates for the YouTube app corresponding to each video resolution quality, where the YouTube app will select the resolution only if the perceived network speed exceeds the data usage rate corresponding to that video. Proxy 130 effectively controls which resolution is selected by the YouTube app by using a bitrate limit at or just above the desired video resolution.

| Video Service | Data usage per second | Estimated Resolution Quality | Estimated Savings Compared to 1080p |
|---|---|---|---|
| YouTube | 4464 | 1080p | — |
|  | 2114 | 720p | 53% |
|  | 927 | 480p | 79% |
|  | 600 | 360p | 87% |
|  | 349 | 240p | 92% |
|  | 100 | 144p | 98% |

The result of applying a bitrate limit to ABR streams is that the total data consumption may be significantly reduced, up to over 90% when compared to the highest possible resolution, without causing any delay or buffering of the video. The only impact would be on a lower resolution video, and a user may be willing to view a lower resolution video to save on their data usage costs. As shown in the table, the data usage difference is substantial between each resolution level, and generally increases faster than the corresponding increase in resolution. For example, a 2× increase in resolution from 360p to 720p will result in a 3.4× increase in data consumption. A reduction by just one resolution level may have a significant reduction in data usage, such as a resolution reduction from 1080p to 720p is 33% but will yield 53% in data usage reduction. On a small mobile device, this may have little discernable visible difference in quality for the user, while providing data savings of over 50%.

Figure 6:
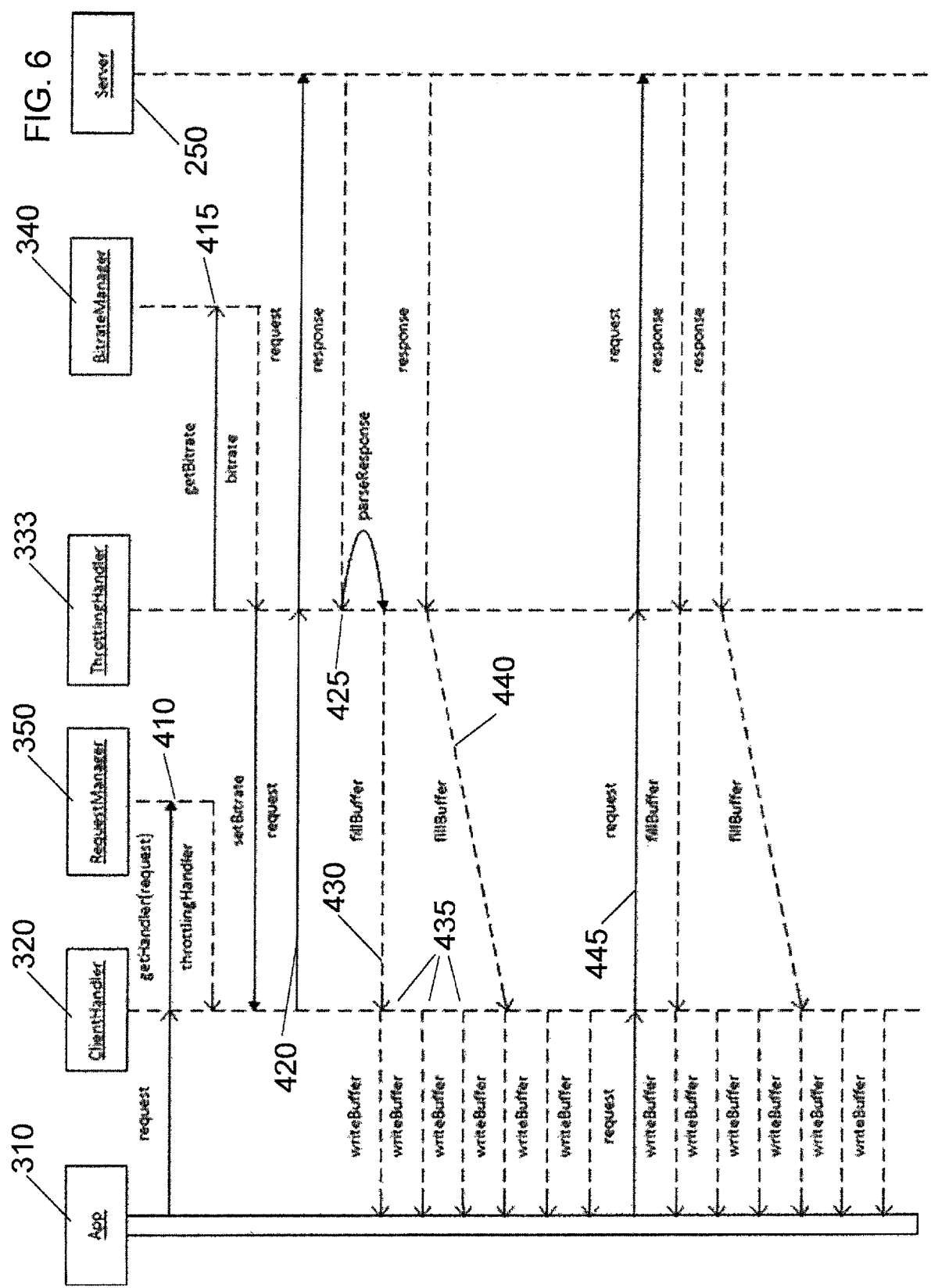
FIG. 6 is a process timing diagram illustrating the handling of requests between an app and a server through a proxy according to an embodiment of the present invention.

FIG. 6 is a process timing diagram illustrating the handling of requests between an app and a server through a proxy according to an embodiment of the present invention. FIG. 6 illustrates an embodiment of the present invention where the bitrate is limited, such as to reduce data consumption on a cellular connection. When an app 310 performs a request for data, such as a video, from app server 250, the request is intercepted by ClientHandler 320 at step 410. ClientHandler 320 may determine how to handle it or it may provide the request to RequestManager 350 to make the determination, which may assign ThrottlingHandler 333 for handling the request. ThrottlingHandler 333 may consult with BitrateManager 340 at step 415 to determine the appropriate bitrate limit to apply, such as based on policies associated with the app, the network type, or the type of data being requested. ClientHandler 320 submits the request to ThrottlingHandler 333 at step 420, which handles the interaction with app server 250 to process the request.

When app server 250 begins sending the response for the request at step 425, ThrottlingHandler 333 may parse the response, such as to determine the rate it should receive the data from the server. As the response data is received from app server 250, ThrottlingHandler 333 may store the response data in either volatile storage, non-volatile memory, or a combination thereof at step 430. As data is received from app server 250, ClientHandler 320 at step 435 may transmit the stored response data to app 310, which may occur at a different rate than the rate it was received by ThrottlingHandler 333 from app server 250. This continues as additional response data is received at step 440 for the first request. When the response is complete, app 310l may continue to issue additional requests for subsequent data at step 445, such as for ABR video streams that are broken up into separate time-based chunks that may be individually addressable via HTTP URLs. FIG. 6 may be assumed to continue until the data requested by app 310 is complete, as would be apparent to someone of ordinary skill in the art.

According to another embodiment of the present invention, the bitrate limit may be controlled through other means, such as by modifying a list of streams that are being reported by app server 250. For example, several of the ABR streaming approaches rely on having the server notify the app of the available streams via a list called a manifest. When a video is initially requested, the app will obtain the manifest from the server and select a stream to play, where the selection would typically be based on the network speed perceived by the app. Therefore, another approach to controlling the bitrate is to modify the manifest received from the server, such as to limit the available streams to the app. For example, when app 310 requests the manifest from app server 250, proxy 130 may modify the manifest and remove the higher resolution video streams from it before transmitting the manifest to app 310, thus limiting app 310 to only being able to play the streams remaining in the manifest. This effectively allows proxy 130 to limit app 310 to those streams that are allowed within the policies specified by BitrateManager 340. This approach may be applied to any streaming approach where the server provides or advertises multiple streams to the client, where the set of available streams may then be modified by embodiments of the present invention.

According to another embodiment of the present invention, another means by which the bitrate limit may be controlled is by rejecting or otherwise blocking access to one or more of the streams within the set of streams provided or advertised by the server. For example, proxy 130 may allow access to one or more of the available streams requested by app 310, while blocking access to other streams, which would effectively allow proxy 130 to limit app 310 to those streams that are allowed within the policies specified by BitrateManager 340. There is a variety of ways that access to streams may be blocked, including rejecting the connection, returning an error for the request, or allowing the request to time out. This approach may be selectively applied to specific apps that support it, since some apps may not be able to properly support certain blocking mechanisms and may need to be blocked in specific ways.

According to another embodiment of the present invention, proxy 130 may support receiving data in bursts, such that the size or frequency of how data is received by the device from app server 250 differs from how app 310 may otherwise request or receive the data. For example, it may be desirable to download only the next partial portion of a video as it is watched, such as the next 30 seconds instead of an entire 5 minute progressive video, because the user may not watch the entire video. In such a case, for example, a fast network and a fast server may allow the entire 5 minute video to be downloaded even though only 10 seconds were watched by the user, all of which still counts against the user's data plan.

On the other hand, it may be undesirable to download too little of the video at a time, such as only the next 7 seconds at a time as is common for an ABR video, because this may prevent a cellular radio and connection from ever becoming idle. In this case, a cellular radio may stay in active, high power mode because its inactivity timer may be longer (e.g., 15 seconds) than the amount of video being downloaded each time (e.g., 5 seconds). On cellular networks, this may result in increased cell tower signaling, congestion, and device battery consumption. Depending on the type and actual speed of the network, it may be desirable to receive data in different burst sizes, so as to draw a balance between downloading enough to allow the cellular radio to become idle without downloading too much to avoid wasting unconsumed data.

Figure 7:
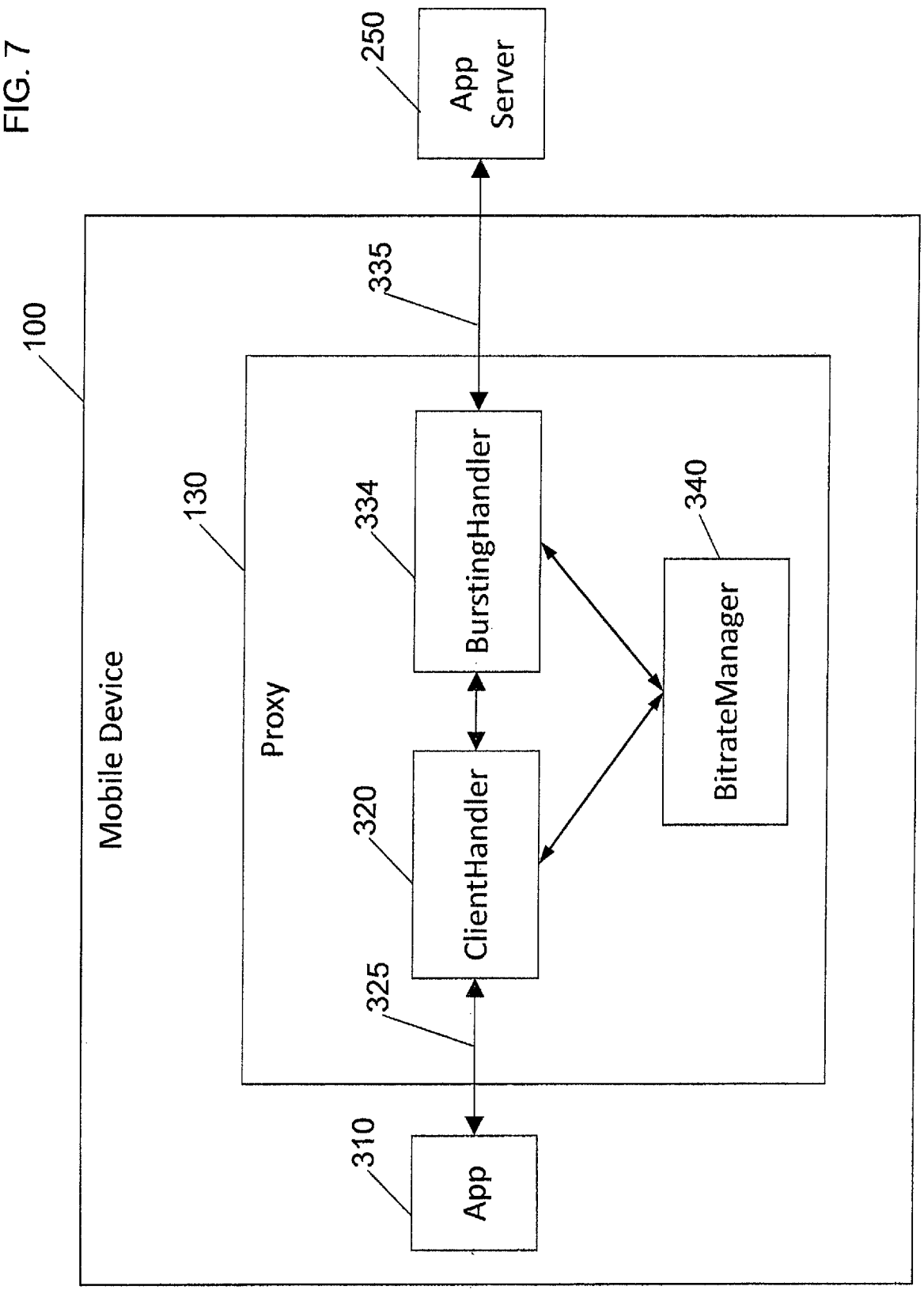
FIG. 7 is a block diagram of the software components within a proxy to enable monitoring and control of network traffic between an app and a server according to another embodiment of the present invention.

FIG. 7 is a block diagram of the software components within a proxy 130 to enable monitoring and control of network traffic between an app 310 and a server 250 according to another embodiment of the present invention. FIG. 7 illustrates an embodiment of the present invention where a BurstingHandler 334 is a type of RequestHandler provided to request or receive data in bursts from app server 250, such that this data may be requested or received in different amounts or at different frequencies than would otherwise be done by app 310 without proxy 130 or BurstingHandler 334. BurstingHandler 334 requests data from app server 250 on data path 335 independently from the ClientHandler 320 sending/receiving data to app 310 on data path 325. BurstingHandler 334 may coordinate with BitrateManager 340 to determine the appropriate rate to request/receive data from app server 250, based upon various factors (for example, to improve or maximize efficiency and performance).

For example, factors that increase or maximize the idle time of a cellular connection may include the network type (e.g., LTE, EDGE, etc.), effective network speed, network inactivity timer (e.g., 15 seconds), and video encoding bitrate. As a further example, we may calculate the burst size needed based upon the desired network idle time, the network delivery bitrate, and video encoding bitrate using the following equation:

$$\text{<desired idle time>}/\text{<bitrate ratio>}*\text{<video encoding bitrate>}=\text{<burst size>}$$

Here, the bitrate ratio is the ratio between the video encoding bitrate and the network delivery bitrate, such as a value of 0.5 when the video is encoded at 2 MBs per second and the data delivery rate from the network is 4 MBs per second. For example, with this same bitrate ratio, if the desired idle time is 45 seconds, such as to allow for a 15 second inactivity time window to be followed by a 30 second dormancy time window, then the burst size is calculated as:

$$45 \text{ seconds}/0.5*2 \text{ MB/second}=180 \text{ MBs}$$

It should be noted that additional factors may be considered to determine a burst size for other reasons, such as to improve battery life of the device, avoid stalling of video streams, or other scenarios that would be apparent to one of ordinary skill in the art.

Figure 8:
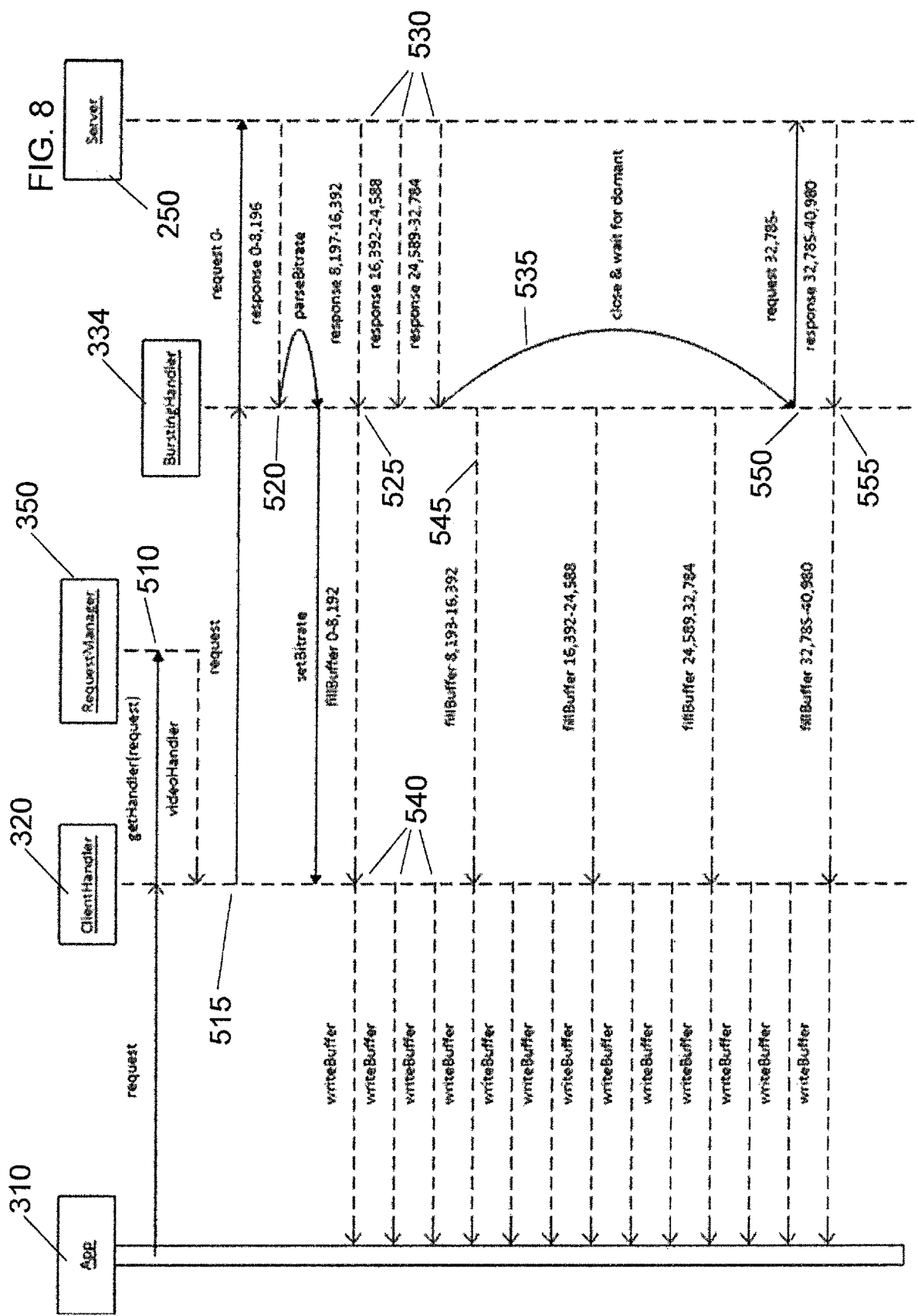
FIG. 8 is a process timing diagram illustrating the handling of requests between an app and a server through a proxy according to another embodiment of the present invention.

FIG. 8 is a process timing diagram illustrating the handling of requests between an app 310 and a server 250 through a proxy 130 according to another embodiment of the present invention. FIG. 8 illustrates an embodiment of the present invention where bursting is performed, such as to increase or maximize idle time for a cellular connection. When an app 310 performs a request for data, such as a video, from app server 250, the request is intercepted by ClientHandler 320. ClientHandler 320 may determine how to handle it or it may provide the request to RequestManager 350 at step 510 to make the determination, which may assign BurstingHandler 334 for handling the request. ClientHandler 320 submits the request to BurstingHandler 334 at step 515, which handles the interaction with app server 250 to process the request.

When app server 250 begins sending the response for the request at step 520, BurstingHandler 334 may parse the response, such as to determine the rate it should receive the data from the server and it may also coordinate with ClientHandler 3201 to set the rate the data should be transmitted to app 310. As the response data is received from app server 250, BurstingHandler 334 may store the response data in either volatile memory, non-volatile memory, or a combination thereof at step 525. BurstingHandler 334 may calculate a burst size and begin receiving additional data up to the determined burst size at step 530 based on policies, such as achieving a minimum cellular idle time. If the data stream includes one or more individually addressable chunks of data, such as each one being individually addressed via HTTP URLs, BurstingHandler 334 may issue the necessary requests to receive data up to the target burst size.

When the target burst size of data is received, BurstingHandler 334 may then stop receiving data at step 535, which may include closing the associated network connection, such as for a TCP connection, which begins the start of the target idle time. As data is received from app server 250, ClientHandler 320 at step 540 may transmit the stored response data to app 310, which may occur at a different rate than the rate it was received by BurstingHandler 334 from app server 250. This continues at step 545 and beyond as needed until the data that was received in the first burst has been transmitted to app 310. When the next burst is ready to begin, BurstingHandler 334 at step 550 may begin requesting subsequent data from app server 250, and begin storing the next burst at step 555 for ClientHandler 320, which may then transmit the subsequent response data to app 310 at a rate that may differ from the rate it was received by BurstingHandler 334 from app server 250. FIG. 8 may be assumed to continue until the data requested by app 310 is complete, as would be apparent to someone of ordinary skill in the art.

FIG. 9 is a flow diagram illustrating an example method of adaptive rate control and traffic management according to an embodiment of the present invention. This and other methods disclosed herein may be implemented, for example, as a series of computer instructions to be executed by a processor (or other computing device), such as a microprocessor, or two or more processors. The processor(s) may execute computer program instructions and interact with other system components for performing the various functionalities described herein. The computer program instructions may be stored in a memory implemented using a standard memory device, such as, for example, a random access memory (RAM). The computer program instructions may also be stored in other non-transitory computer readable media such as, for example, a CD-ROM, flash drive, or the like. The methods may also be implemented using hardware circuits (e.g., transistors, capacitors, logic gates, FPGAs, etc.), or combinations of hardware circuits, software, and firmware, as would be apparent to one of ordinary skill.

Referring to FIG. 9, processing begins, and in step 910, a traffic manager application (for example, an app running on a processor of a smartphone connected to a server over a network) identifies a first application running on the processor and delivering first data to or from the server over the network. In step 920, the traffic manager application intercepts electronic traffic of the first data to or from the first application. In step 930, the traffic manager application controls a rate of delivery of the first data to or from the first application or to or from the server. Each of these steps may be carried out, for example, using above-described techniques as illustrated, for example, in FIGS. 1-8.

In a similar fashion, in step 940, the traffic manager application identifies a second application running on the processor and delivering second data to or from the server over the network. In step 950, the traffic manager application intercepts electronic traffic of the second data to or from the second application. In step 960, the traffic manager application controls a rate of delivery of the second data to or from the second application or to or from the server.

The first and second applications are competing for the same network resources. Accordingly, in step 970, the traffic manager application, following a policy goal to allow more network bandwidth to the first application over the second application, concurrently limits the rates of delivery of the first and second data so that the rate of delivery of the first data exceeds the rate of delivery of the second data. This technique may be extended and continued in this fashion to concurrent traffic management of still more applications and corresponding policy goals as would be apparent to one of ordinary skill.

While the present invention has been described in connection with certain example embodiments, it is to be understood that the invention is not limited to the disclosed embodiments, but, on the contrary, is intended to cover various modifications and equivalent arrangements as would be apparent to one of ordinary skill in the art without departing from the spirit and scope of the invention as defined by the following claims, and equivalents thereof.

What is claimed is:

1. A method of communication traffic management on a portable communication device having a computer processor and a network connection to a server for transmitting or receiving data with the server over a network, the method comprising:
   intercepting, by a traffic manager application running on the processor, network traffic of first data comprising video data received from the server and requested by a first application running on the processor, the traffic manager application receiving the video data from the server at a first rate of delivery along the network connection;
   identifying, by the traffic manager application, the first application and, the traffic manager application delivering the video data received from the server over the network;
   selecting, by the traffic manager application, a first policy associated with at least one of: the first application; a type of the network connection; or the server; and
   limiting, by the traffic manager application in accordance with the first policy, a second rate of delivery of the video data, as received from the server, to the first application along an internal network data path, internal to the portable communication device, between the first application and the traffic manager application, the second rate of delivery of the video data along the internal network data path being lower than the first rate of delivery of the video data along the network connection, wherein the second rate of delivery corresponds to a specific target video resolution.

2. The method of claim 1, wherein the limiting of the second rate of delivery of the first data comprises throttling a present speed of the network as perceived by the first application to less than the present speed of the network.

3. The method of claim 2, wherein the network traffic of the first data comprises data being transmitted using a secure protocol for Hypertext Transfer Protocol (HTTPS).

4. The method of claim 1, wherein the limiting of the second rate of delivery of the first data comprises throttling the second rate of delivery of the first data from the server to less than a present speed of the network.

5. The method of claim 1, wherein the network traffic of the first data comprises an adaptive bitrate stream.

6. The method of claim 1, wherein the network traffic of the first data comprises a progressive stream.

7. The method of claim 1, wherein
the first application supports a plurality of data rates having different corresponding resolutions as controlled by a manifest; and
the method further comprises editing the manifest to hide or remove those of the data rates that exceed the second rate of delivery.

8. The method of claim 1, wherein
the first application supports a plurality of data rates having different corresponding resolutions; and
the method further comprises failing or blocking access to those of the data rates that exceed the second rate of delivery.

9. The method of claim 1, further comprising:
identifying, by the traffic manager application, a second application running on the processor and delivering second data received from the server over the network to the second application;
selecting, by the traffic manager application, a second policy associated with the second application;
intercepting, by the traffic manager application, network traffic of the second data to the second application; and
limiting, by the traffic manager application in accordance with the second policy, a third rate of delivery of the second data to the second application from the server.

10. The method of claim 9, wherein the limiting of the second rate of delivery of the first data and the third rate of delivery of the second data comprises concurrently limiting the second rate of delivery of the first data and the third rate of delivery of the second data so that the second rate of delivery of the first data exceeds the third rate of delivery of the second data.

11. The method of claim 1, wherein the intercepting of the network traffic comprises using an internal proxy running on the processor.

12. The method of claim 1, wherein the intercepting of the network traffic comprises using a virtual private network (VPN) interface on the processor.

13. The method of claim 1, wherein the intercepting of the network traffic comprises running a modified said first application on the processor, the modified first application being configured to request the intercepting of the network traffic.

14. A system for communication traffic management, the system comprising:
a portable communication device having a computer processor and a network connection to a server for transmitting or receiving data with the server over a network; and
a nonvolatile storage device coupled to the processor and storing instructions that, when executed by the processor, cause the processor to execute a traffic manager application configured to:
intercept network traffic of first data comprising video data received from the server and requested by a first application running on the processor, the traffic manager application receiving the video data from the server at a first rate of delivery along the network connection;
identify the first application, the traffic manager application delivering the video data received from the server over the network;
select a first policy associated with at least one of: the first application; a type of the network connection; or the server; and
limit, in accordance with the first policy, a second rate of delivery of the video data, as received from the server, to the first application along an internal network data path, internal to the portable communication device, between the first application and the traffic manager application, the second rate of delivery of the video data along the internal network data path being lower than the first rate of delivery of the video data along the network connection, wherein the second rate of delivery corresponds to a specific target video resolution.

15. The system of claim 14, wherein the instructions, when executed by the processor, further cause the processor to limit the second rate of delivery of the first data by throttling a present speed of the network as perceived by the first application to less than the present speed of the network.

16. The system of claim 15, wherein the network traffic of the first data comprises data being transmitted using a secure protocol for Hypertext Transfer Protocol (HTTPS).

17. The system of claim 14, wherein the instructions, when executed by the processor, further cause the processor to limit the second rate of delivery of the first data by throttling the second rate of delivery of the first data from the server to less than a present speed of the network.

18. The system of claim 14, wherein the network traffic of the first data comprises an adaptive bitrate stream.

19. The system of claim 14, wherein the network traffic of the first data comprises a progressive stream.

20. The system of claim 14, wherein
the first application supports a plurality of data rates having different corresponding resolutions as controlled by a manifest; and
the instructions, when executed by the processor, further cause the processor to edit the manifest to hide or remove those of the data rates that exceed the second rate of delivery.

21. The system of claim 14, wherein
the first application supports a plurality of data rates having different corresponding resolutions; and
the instructions, when executed by the processor, further cause the processor to fail or block access to those of the data rates that exceed the second rate of delivery.

22. The system of claim 14, wherein the instructions, when executed by the processor, further cause the processor to:
identify a second application running on the processor and delivering second data received from the server over the network to the second application;
select a second policy associated with the second application;
intercept network traffic of the second data to the second application; and
limit in accordance with the second policy, a third rate of delivery of the second data to the second application from the server.

23. The system of claim 22, wherein the instructions, when executed by the processor, further cause the processor to limit the second rate of delivery of the first data and the third rate of delivery of the second data by concurrently limiting the the second rate of delivery of the first data and the third rate of delivery of the second data so that the second rate of delivery of the first data exceeds the third rate of delivery of the second data.

24. The system of claim 14, wherein the instructions, when executed by the processor, further cause the processor to intercept the network traffic by using an internal proxy running on the processor.

25. The system of claim 14, wherein the instructions, when executed by the processor, further cause the processor to intercept the network traffic by using a virtual private network (VPN) interface on the processor.

26. The system of claim 14, wherein the instructions, when executed by the processor, further cause the processor to intercept the network traffic by running a modified said first application on the processor, the modified first application being configured to request the intercepting of the network traffic.

27. The method of claim 1, further comprising receiving the first data from the server at a network data rate greater than the second rate of delivery of the first data to the first application along the internal network data path.

28. The system of claim 14, wherein the nonvolatile storage device further stores instructions that, when executed by the processor, cause the processor to: receiving the first data from the server at a network data rate greater than the second rate of delivery of the first data to the first application along the internal network data path.

* * * * *